UNITED STATES PATENT OFFICE.

SIDNEY GILCHRIST THOMAS, OF LONDON, ENGLAND.

MANUFACTURE OF ALKALINE SALTS.

SPECIFICATION forming part of Letters Patent No. 304,044, dated August 26, 1884.

Application filed January 24, 1884. (No specimens.) Patented in Belgium June 21, 1884, No. 65,548, and in Luxemburg July 1, 1884, No. 414.

*To all whom it may concern:*

Be it known that I, SIDNEY GILCHRIST THOMAS, of 9 Palace Chambers, Westminster Bridge, London, England, temporarily residing in the town of Algiers, Africa, have invented certain new and useful Improvements in the Manufacture of Alkaline Salts; and I do hereby declare that the following is a full, clear, and exact description of the invention, which will enable others skilled in the art to which it appertains to make and use the same.

This invention relates to the manufacture of alkaline silicates and carbonates and other alkaline salts from common salt or potassic chloride. The acids at present used for the decomposition of alkaline chlorides are either sulphuric acid or carbonic acid, and in both the processes at present employed—viz., the Leblanc and the ammonia process—large quantities of lime are converted into a waste product. In the ammonia process the expensive agent, ammonia, is also wasted in considerable quantity, while expensive and special plant is required in carrying out both processes. The decomposition of chlorides by sand and steam by the use of special apparatus has also been proposed, but, owing to the cost of the apparatus and imperfection of the decomposition and other drawbacks, has not proved technically successful. By my invention I substitute for the decomposing reagents above mentioned nascent silica in a shape in which it is now a waste product, and utilize the apparatus and the heat employed in the manufacture of steel or iron, so as to decompose the alkaline chlorides simultaneously with the production of steel, &c.

In carrying out my invention, I employ a Bessemer converter or Siemens furnace. When using a Bessemer converter, I prefer to employ a pig-iron high in silicon, (what is called "glazed pig," which contains over four per cent. of silicon, may be used with advantage,) and to use a large volume of blast, and I prefer side tuyeres, though these are not indispensable. I introduce the chloride chiefly through the tuyeres, though part may be introduced by throwing it into the converter. This part should be protected from volatilization and being blown out by the blast by being inclosed in a rough iron casing, or by being compressed into bricks with iron ore or otherwise. The total amount of sodic chloride introduced should be not less than six or eight times the weight of the silicon contained in the pig. If phosphorus is also present, a further similar quantity of salt is employed, as described by me in a specification lodged by me of even date with the present, and a basic lining must be necessarily used. I prefer, however, that the operation of converting the phosphorus into phosphate of soda should be performed in a separate vessel or furnace. It is to be observed that while the treatment of silicious pig with steam and air, or even superheated steam alone, raises the temperature of the metal by the combustion of the silicon, the combustion of carbon by steam seriously lowers the temperature of the metal. It is therefore often desirable to stop the injection of steam when the carbon begins to be rapidly attacked, and even to continue the operation, so far as the manufacture of steel is concerned, in another furnace or converter. The metal is run into the converter very hot, and I prefer to use vessels capable of treating at least six tons of iron at a time.

To facilitate the decomposition of the chloride, I find it necessary to also blow in with the blast superheated steam or hydrogen or hydrocarbon vapor. The salt rising through and being mixed with the metal is transformed into silicate, and the sodic silicate, with some oxide of iron and lime, forms a fusible slag, which is run off into a ladle, the steel being finished in the usual way. The slag, preferably while still hot, is treated in lixiviating-tanks, and the solution of alkaline silicate may be treated with carbonic acid to produce carbonate of soda or potash. If a gas-furnace is employed instead of a Bessemer vessel, both hearth and roof, and preferably the regenerators also, if these are employed, may be constructed of lime or magnesia, as the splashings and volatilized alkali flux silica bricks. The salt may be introduced in about the same quantity as above mentioned, part being introduced onto the hearth, preferably as highly-compressed bricks, covered with an iron plate or oxide of iron, and part being blown in through a movable tuyere, through which air, and also steam or hydrogen, or hydrocarbon vapor, is introduced in order to facilitate the reaction. The slag, consisting, mainly, of silicate of soda, is run off from time to time into ladles and transferred to lixiviating-tanks, as before mentioned.

Instead of using a Bessemer converter, which I prefer, or a Siemens furnace, I sometimes employ a puddling-furnace, preferably of the rotary description—such as a Daubis furnace. I line this furnace with a basic material, preferably lime or magnesia or oxide-of-iron bricks, and run in the pig-iron in a fluid condition. I introduce the salt in a rough thin iron casing, or compressed into bricks, preferably with oxide of iron. Iron ore is used to produce boiling and facilitate the oxidation in the usual way. The salt used must amount to at least six times, and with advantage to eight times, the weight of the silicon contained in the pig. Thus for every ton of pig-iron containing two per cent. silicon I employ at least twelve per cent. of salt. The slag produced is run off from time to time and treated as above described. The gases from the furnace or converter are passed through condensing-towers in all cases to recover the chlorine and hydrochloric acid liberated, and any alkali carried over by cooling them down with water-jets.

Having fully described my invention, I wish it to be understood that I do not claim as part of my present invention the lining of metallurgical furnaces with lime or magnesia, nor the employment of basic-lined converters or furnaces for the manufacture of iron or steel; nor do I claim, broadly, the use of salt as a flux in metallurgical operations; nor do I claim the use of small quantities of salt as a flux in the puddling or Bessemer or Siemens process; nor do I claim the use of silica for decomposing phosphates of iron, nor the use of silica, broadly, for decomposing salt, except when such latter decomposition is effected by the aid of and in presence of molten iron, which acts as an inducing cause and supplies the heat necessary for the decomposition of the salt; but

I claim—

1. The herein-described process of decomposing alkaline chlorides, and the production of alkaline silicates and other non-haloid alkaline salts and hydrates, together with chlorine and hydrochloric acid, by acting on common salt in a Bessemer converter or Siemens or puddling furnace by means of the silicon contained in molten pig-iron in presence of the oxygen of the air, oxide of iron, or other oxygen-yielding body.

2. In the manufacture of alkaline silicates and salts, the process of producing such silicates by acting on the nascent silica obtained by oxidizing molten silicious pig-iron by alkaline chlorides in presence of steam or hydrogen.

3. In the manufacture of non-haloid alkaline salts from their chlorides by means of molten iron, submitting the chlorides to treatment, inclosed in iron cases or compressed into shapes with or without oxide of iron, for the purpose of rendering the reaction more effective and preventing volatilization.

SIDNEY GILCHRIST THOMAS.

Witnesses:
L. E. THOMAS,
EVA TINDALL,
    *Both of Hotel Kirsch, Algiers.*